(12) United States Patent
Wang et al.

(10) Patent No.: US 10,946,448 B2
(45) Date of Patent: Mar. 16, 2021

(54) COLD ADDITIVE AND HOT FORGING COMBINED FORMING METHOD OF AMORPHOUS ALLOY PARTS

(71) Applicant: Huazhong University of Science and Technology, Hubei (CN)

(72) Inventors: Xinyun Wang, Hubei (CN); Pan Gong, Hubei (CN); Yunfei Ma, Hubei (CN); Lei Deng, Hubei (CN); Junsong Jin, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 15/961,437

(22) Filed: Apr. 24, 2018

(65) Prior Publication Data
US 2019/0224753 A1 Jul. 25, 2019

(30) Foreign Application Priority Data
Jan. 22, 2018 (CN) .......................... 201810060296.4

(51) Int. Cl.
*B22F 3/17* (2006.01)
*B21J 1/00* (2006.01)
(Continued)

(52) U.S. Cl.
CPC ................. *B22F 3/17* (2013.01); *B21J 1/006* (2013.01); *B21J 5/002* (2013.01); *B22F 1/0059* (2013.01);
(Continued)

(58) Field of Classification Search
None
See application file for complete search history.

(56) References Cited

U.S. PATENT DOCUMENTS

| 3,651,685 A | * | 3/1972 | Tominaga | ................. B21J 9/12 |
| | | | | 72/402 |
| 5,344,605 A | * | 9/1994 | Kaji | ....................... B22F 3/105 |
| | | | | 419/31 |

(Continued)

FOREIGN PATENT DOCUMENTS

JP 1096337 A * 4/1989

OTHER PUBLICATIONS

JP 1096337 A English Translation (Year: 1989).*

*Primary Examiner* — Alexandra M Moore
*Assistant Examiner* — Catherine P Smith
(74) *Attorney, Agent, or Firm* — Hamre, Schumann, Mueller & Larson, P.C.

(57) ABSTRACT

The present invention discloses a cold additive and hot forging combined forming method of amorphous alloy parts. The present invention belongs to the field of cold additive manufacturing technology and thermoplastic forming of amorphous alloy, and more particularly relates to a cold additive and hot forging combined forming method of amorphous alloy parts, the method comprising: (1) making amorphous alloy powder into a pre-forging blank by the micro-jetting and bonding 3D printing technology; and (2) placing the pre-forging blank in the step (1) in a closed forging die to perform hot closed-die forging so as to obtain an amorphous alloy part, wherein the contour size and shape of the pre-forging blank are designed according to the contour size and shape of the inner cavity of the closed forging die; and an exhaust hole is provided in the closed forging die such that gas generated by gasification or decomposition of the binder at a hot die forging temperature is discharged through the exhaust hole in the closed forging die. In the present invention, a bulk amorphous alloy part (Continued)

with a large size and a complex shape can be prepared by the cold additive and hot forging combined forming method.

10 Claims, 3 Drawing Sheets

(51) Int. Cl.
*B22F 1/00* (2006.01)
*B21J 5/00* (2006.01)
*B33Y 10/00* (2015.01)
*B33Y 70/00* (2020.01)
*B33Y 80/00* (2015.01)

(52) U.S. Cl.
CPC ..... *B22F 2003/175* (2013.01); *B22F 2304/10* (2013.01)

(56) References Cited

U.S. PATENT DOCUMENTS

| | | | | |
|---|---|---|---|---|
| 5,613,183 A * | 3/1997 | Wiech, Jr. | ............. | B22F 1/0077 |
| | | | | 264/612 |
| 5,632,827 A * | 5/1997 | Fujita | .................. | C22C 32/0047 |
| | | | | 148/415 |
| 2005/0023710 A1* | 2/2005 | Brodkin | ............. | A61C 13/0003 |
| | | | | 264/16 |
| 2010/0044547 A1* | 2/2010 | Higashi | ................... | B22F 3/003 |
| | | | | 249/79 |
| 2012/0132625 A1* | 5/2012 | Kaltenboeck | ............ | C21D 1/34 |
| | | | | 219/121.11 |
| 2014/0308091 A1* | 10/2014 | Yamazaki | ................ | B21K 1/46 |
| | | | | 411/190 |
| 2017/0203355 A1* | 7/2017 | Satoh | ................. | B23K 15/0086 |
| 2018/0154437 A1* | 6/2018 | Mark | .................... | B22F 3/1025 |
| 2018/0339338 A1* | 11/2018 | Hofmann | .............. | B22F 3/1055 |

* cited by examiner

ACCOMPANYING FIGURES

COLD ADDITIVE AND HOT FORGING COMBINED FORMING METHOD OF AMORPHOUS ALLOY PARTS

BACKGROUND OF THE PRESENT INVENTION

Field of the Present Invention

The present invention belongs to the technical field of cold additive manufacturing and thermoplastic forming of amorphous alloy, and more particularly relates to a cold additive and hot forging combined forming method of amorphous alloy parts.

Description of the Related Art

Amorphous alloys have, due to their unique amorphous structure, superior mechanical, physical and chemical properties compared to conventional crystalline alloys, such as high strength, good wear resistance and corrosion resistance, and also exhibit superplasticity in the supercooled liquid region, which enables thermoplastic forming. Therefore, the amorphous alloys have broad potential prospects in aerospace, precision instruments, military, chemical and other fields.

In order to avoid crystallization during solidification, the alloy liquid needs to be solidified at a relatively fast cooling rate to obtain a sample with a completely amorphous structure. Therefore, one of the technical bottlenecks restricting the wide application of the amorphous alloys is size limitation, and the maximum size of amorphous alloys obtained by a copper mold casting method or a water quenching method is only 80 mm in diameter.

At present, preparation methods of amorphous alloy parts mainly include a thermoplastic forming method, a powder sintering method, a welding assembly method, an additive manufacturing method and so on. In the thermoplastic forming method (such as compression molding and blow molding), it is difficult to manufacture a large-sized and complex-shaped part; in the latter three method, although the size limitation is broken through, the internal structure of the samples prepared by the powder sintering method is often not dense enough, and the mechanical properties are relatively poor; in the welding assembly method, performance difference between the welding portion and the matrix limits the application range of the part, and the welding thermal stress can easily lead to deformation and cracking of the components; and in the additive manufacturing method (such as amorphous powder selective laser melting), problems such as crystallization and microcrack, which are difficult to be solved, occur during the forming process, the material utilization is relatively low, and the precision and surface quality of the formed parts also need to be improved. Thus, it is necessary to develop a new precision forming method of large-size and complex-shaped amorphous alloy parts.

SUMMARY OF THE PRESENT INVENTION

In view of the above-described problems, the present invention provides a cold additive and hot forging combined forming method of amorphous alloy parts, which fully combines the characteristics and requirements of the amorphous alloy parts and targetedly redesigns their forming method. Thus, a cold additive and hot forging combined forming method of large-size and complex-shaped amorphous alloy parts is correspondingly obtained, thereby solving the technical problems such as size limitation, shape limitation and poor density in the forming methods of bulk amorphous alloys in the prior art.

In order to achieve the above objective, according to an aspect of the present invention, there is provided a cold additive and hot forging combined forming method of amorphous alloy parts, comprising the following steps:

(1) making amorphous alloy powder into a pre-forging blank by the micro-jetting and bonding 3D printing technology, specifically comprising: laying powder first, and then spraying binder to form a bonding layer; and repeating the operations of powder laying and binder spraying until a three-dimensional pre-forging blank is printed; and (2) placing the pre-forging blank in the step (1) in a closed forging die to perform hot closed-die forging so as to obtain an amorphous alloy part, wherein the contour size and shape of the pre-forging blank are designed according to the contour size and shape of the inner cavity of the closed forging die; and an exhaust hole is provided in the closed forging die such that gas generated by gasification or decomposition of the binder at a hot die forging temperature is discharged through the exhaust hole in the closed forging die.

Preferably, the selection criteria of the amorphous alloy are: an amorphous formation critical size of not less than 10 mm, a supercooled liquid region $\Delta T_x$ of more than 50K and a thermoplastic forming capability index S of more than 0.15

Preferably, the amorphous alloy powder has an average particle size of 20 μm to 50 μm.

Preferably, the amorphous alloy powder is prepared by a vacuum gas atomization method.

Preferably, the bonding layer has a thickness of 0.015 mm to 0.1 mm.

Preferably, a vibration device is provided at an upper punch of the closed forging die to improve the thermoplastic forming of the amorphous alloy.

Preferably, the vibration device is an ultrasonic vibration device or a mechanical vibration device.

Preferably, heating modes of the hot closed-die forging include heating by the resistor heating rod, induction heating or flame heating.

Preferably, the heating mode of the hot closed-die forging is heating by resistor heating rods.

Preferably, the resistor heating rods feature following distribution, and specifically, the resistor heating rods are distributed along the shape of the inner cavity of the closed forging die.

Preferably, the hot closed-die forging temperature is between a glass transition temperature $T_g$, and an initial crystallization temperature $T_x$ of the amorphous alloy.

Preferably, the hot closed-die forging time is shorter than the crystallization starting time of the amorphous alloy at the employed forging temperature.

Preferably, the binder is silica sol, polyvinyl alcohol or maltodextrin; and the mass of the binder is 6% to 10% of the mass of the amorphous alloy powder.

Preferably, the binder is silica sol.

Preferably, according to the gas flowing direction during forging, the exhaust hole is opened at a part in the closed forging die where the discharge of gas is facilitated, and the exhaust hole is connected to a suction pump.

Preferably, the exhaust hole has a size of less than 0.5 mm.

Preferably, the hot closed-die forging is performed under a protective atmosphere to avoid oxidation.

Preferably, the protective atmosphere is an inert atmosphere.

In general, compared with the prior art, the present invention has the following beneficial effects:

(1) in the present invention, the proposed forming method of amorphous alloy parts combines the micro-jetting and bonding 3D printing technology and the hot closed-die forging technology, in which amorphous alloy powder is printed into a pre-forging blank by the micro-jetting and bonding 3D printing technology, and then the pre-forging blank is placed in a closed forging die to perform hot closed-die forging so as to obtain an amorphous alloy part. The micro-jetting and bonding 3D printing technology and the hot closed-die forging technology are not arbitrarily combined, namely, in the forming of amorphous alloy parts in the present invention, the micro-jetting and bonding 3D printing technology and the hot closed-die forging technology both have irreplaceability and are in a nonexchangeable order with collaborative cooperation and co-action. Thus, the organic combination of the cold additive 3D printing and the hot closed-die forging makes it possible to manufacture a large-size amorphous alloy part with a completely amorphous structure and high dimensional precision;

(2) the pre-forging blank of amorphous alloy prepared by using conventional methods such as copper die casting or water quenching are severely limited in size, while the 3D printing technology can break through the size limitation to produce a pre-forging blank of amorphous alloy with a larger size and a complex structure. Therefore, in the present invention, by printing of the amorphous alloy powder into a pre-forging blank by the micro-jetting and bonding 3D printing technology first and then the hot closed-die forging in the second step, an amorphous alloy part with a larger size and a complex structure can be prepared;

(3) compared with pre-forging blank preparation by the hot additive manufacturing technology such as selective laser sintering or cladding, in the present invention, the pre-forging blank of amorphous alloy is prepared by the micro-jetting and bonding forming method without a laser, which reduces the forming cost and improves the forming speed and material utilization rate. In addition, preparation can be performed at room temperature and support is not required in the forming process. Meanwhile, problems such as crystallization caused by heat-affected zone due to heat, warping deformation or cracking due to thermal stress are effectively avoided in the pre-forging blank preparation process;

(4) in the present invention, the closed die forging is adopted, resulting in that the geometric shape, dimensional precision and surface quality of the forging are close to the product as far as possible, and flash is not generated in the forming process, which reduces the subsequent processing. Compared with the conventional die forging, the powder forging has many advantages such as low energy consumption and high material utilization rate as well as high dimensional precision, dense internal structure, less holes, low forming force and good mechanical properties of forgings;

(5) In the present invention, an ultrasonic vibration device is provided at the upper punch of the closed forging die or mechanical vibration is performed to assist the forming, which can reduce defects and air bubbles in the molded part, improve the thermoplastic formability of the material, increase the forming precision, and simultaneously accelerate the discharge of gas generated by gasification or decomposition of the binder; and (6) In the present invention, resistor heating rods with following distribution are embedded into the cavity die of the closed forging die to uniformly heat the pre-forging blank.

BRIEF DESCRIPTION OF THE DRAWINGS

In all figures, the same elements or structures are denoted by the same reference numerals, in which.

Figure 1:
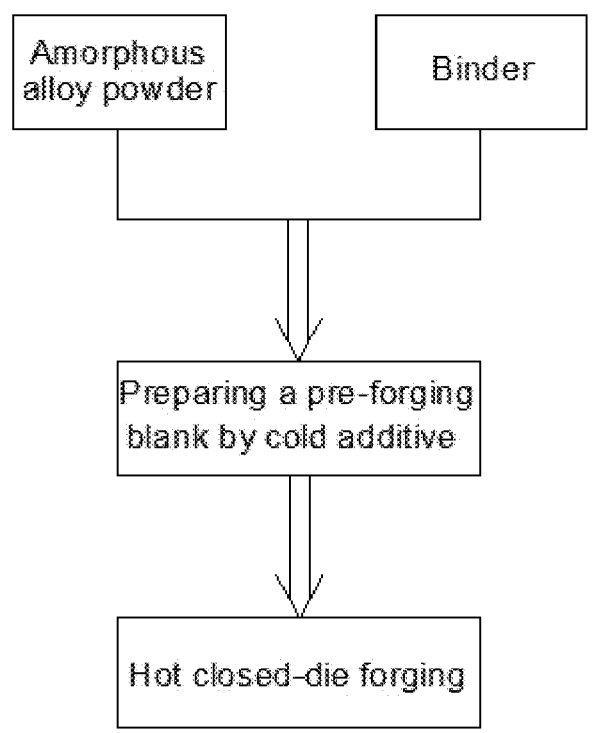
FIG. 1 is a flowchart of a method according to a preferred embodiment of the present invention.

1: nozzle; 2: binder; 3: pre-forging blank; 4: forming cylinder; 5: forming cylinder piston; 6: powder laying roller; 7: powder feeding cylinder; 8: powder feeding cylinder piston; 9: ultrasonic vibration device; 10: upper punch; 11: inner-layer cavity die; 12: outer-layer cavity die; 13: exhaust hole; 14: upper die; 15: parting line; and 16: resistor heating rod.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention.

The present invention provides a cold additive and hot forging combined forming method of amorphous alloy parts, comprising the following steps:

(1) Making amorphous alloy powder into a pre-forging blank by the micro-jetting and bonding 3D printing technology, specifically comprising: laying a layer of amorphous alloy powder by a powder laying roller first, then spraying the binder with a nozzle to form a bonding layer with a thickness of 0.015 mm to 0.1 mm (in order to avoid effect of the step generated by stacking between the layers on the precision of the pre-forging blank, a single-layer bonding layer should not be too thick), and repeating the operations of powder feeding, powder laying and binder spraying until a three-dimensional pre-forging blank is printed.

The selection criteria of the amorphous alloy are: strong amorphous forming ability, good thermostability and good thermoplastic forming property, in which the strong amorphous forming ability indicates that the amorphous formation critical size of the amorphous alloy is not less than 10 mm; the good thermostability indicates that the supercooled liquid region $\Delta T_x$ is larger than 50K ($\Delta T_x = T_x - T_g$, where $T_g$ represents a glass transition temperature and $T_x$ represents an initial crystallization temperature); and the good thermoplastic forming property indicates that the thermoplastic forming capability index S>0.15 ($S = \Delta T_x/(T_L - T_g)$ where $T_L$ represents a liquidus temperature). The amorphous alloys may be, for example, Zr-based amorphous alloy and Cu-based amorphous alloy.

The amorphous alloy powder has an average particle size of 20 μm to 50 μm, and is preferably prepared by a vacuum gas atomization method, since the amorphous alloy powder prepared by the vacuum gas atomization method has good sphericity, uniform composition and uniform particle size distribution. The binder may be silica sol, polyvinyl alcohol or maltodextrin, and is preferably silica sol; and the mass of the binder is 6% to 10% of the mass of the amorphous alloy powder.

(2) Placing the pre-forging blank in the step (1) in a closed forging die to perform hot closed-die forging so as to obtain an amorphous alloy part.

The contour size and shape of the pre-forging blank are designed according to the contour size and shape of the inner cavity of the closed forging die, and preferably, the contour size and shape of the pre-forging blank are approximately the same as those of the inner cavity. Further, one or more exhaust holes may be provided in the closed forging die such that gas generated by gasification or decomposition of the binder at the hot die forging temperature is discharged through the exhaust hole(s).

A vibration device may be mounted at an upper punch of the closed forging die to improve the thermoplastic forming of the amorphous alloy, and the vibration device may be a mechanical vibration device or an ultrasonic vibration device. Heating modes of the hot closed-die forging include heating by the resistor heating rod, induction heating or flame heating, and preferably, the heating mode of the hot closed-die forging is heating by resistor heating rods with following distribution. "Following distribution" here means that the resistor heating rods are distributed along the shape of the inner cavity of the closed forging die. The hot closed-die forging temperature is between a glass transition temperature $T_g$, and an initial crystallization temperature $T_x$ of the amorphous alloy, and the hot closed-die forging time is shorter than the crystallization starting time of the amorphous alloy at the employed forging temperature, in which the crystallization starting time is measured by the isothermal DSC experiment. The upper punch of the closed forging die is connected to a servo drive press machine to form the pre-forging blank into the desired three-dimensional structure. The exhaust hole provided in the closed die is connected to a suction pump, and preferably has a size of less than 0.5 mm, the purpose of which is that the suction pump can increase the negative pressure in the impression to accelerate the discharge of gas generated by gasification or decomposition of the binder due to heat so as not to affect the forging forming. The specific requirement is that the exhaust hole should be provided according to the gas flowing direction during forging and the last filled part of the inner cavity of the cavity die. It is generally recommended that the exhaust hole is provided in the last filled part of the inner cavity of the cavity die. Such opening facilitates the discharge of gas and avoids blockage of the exhaust hole which affects the discharge of gas.

Preferably, the exhaust hole has a size of less than 0.5 mm. The hot closed-die forging may be performed under a protective atmosphere (for example, an inert atmosphere) to avoid oxidation. By selecting appropriate hot forging parameters such as forming temperature and forming time, the formed part still has a completely amorphous structure.

The present invention belongs to the technical field of cold additive manufacturing and thermoplastic forming of amorphous alloy, and more particularly relates to a cold additive and hot forging combined forming method of amorphous alloy parts. A pre-forging blank of amorphous alloy is prepared by the micro-jetting and bonding forming method, and then the pre-forging blank is placed in a closed forging die with resistor heating rods and hot-forged under ultrasonic vibration assistance. By selecting appropriate hot forging parameters such as forming temperature and forming time, the formed part still has a completely amorphous structure. The cold additive is made relative to the hot additive manufacturing (selective laser sintering) in the prior art, and in the present invention, compared with pre-forging blank preparation by the selective laser sintering or cladding technology, the pre-forging blank is prepared by the micro-jetting and bonding forming method without a laser, which reduces the forming cost and improves the forming speed. In addition, preparation can be performed at room temperature and support is not required in the forming process. Meanwhile, problems such as crystallization caused by heat-affected zone due to heat, warping deformation or cracking due to thermal stress are effectively avoided in the pre-forging blank preparation process. In the micro-jetting and bonding 3D printing technology in the present invention, all powders are used for forming with almost no waste, while in the traditional selective laser sintering or cladding technology, the utilization rate of the powder is less than 60% since the powder remaining in the sintering process is contaminated and cannot be reused. On the other hand, compared with the conventional die forging, the powder forging can achieve near-net forming, and has many advantages such as low energy consumption and high material utilization rate as well as high dimensional precision, dense internal structure, less holes, low forming force and good mechanical properties of forgings. In the present invention, a bulk amorphous alloy part with a large size and a complex shape can be prepared by the cold additive and hot forging combined forming method.

In the forming process of an amorphous alloy part, in view of characteristics of the amorphous alloy itself, the amorphous forming time is limited, and the heating time of the forming process should not be too long. In the present invention, a pre-forging blank is prepared by the cold additive micro-jetting and bonding forming method (cold operation) and then the hot closed-die forging, which can well control the heating forming time and powerfully ensure that the forming time is controlled within the crystallization forming time, thus ensuring that the formed part is completely amorphous. The micro-jetting and bonding 3D printing technology and the hot closed-die forging technology are not arbitrarily combined, namely, in the forming of amorphous alloy parts in the present invention, the micro-jetting and bonding 3D printing technology and the hot closed-die forging technology both have irreplaceability and are in a nonexchangeable order with collaborative cooperation and co-action. Thus, the organic combination (a cold operation first and then a hot operation) of the cold additive 3D printing and the hot closed-die forging makes it possible to manufacture a large-size amorphous alloy part with a completely amorphous structure and high dimensional precision.

The present invention is further described in conjunction with an embodiment below.

Embodiment 1

FIG. 1 is a flowchart of a method according to a preferred embodiment of the present invention, and as shown in FIG. 1, a cold additive and hot forging combined forming method of amorphous alloy parts, comprising the following steps:

Step (1): Preparing a Pre-Forging Blank by Cold Additive

Figure 2:
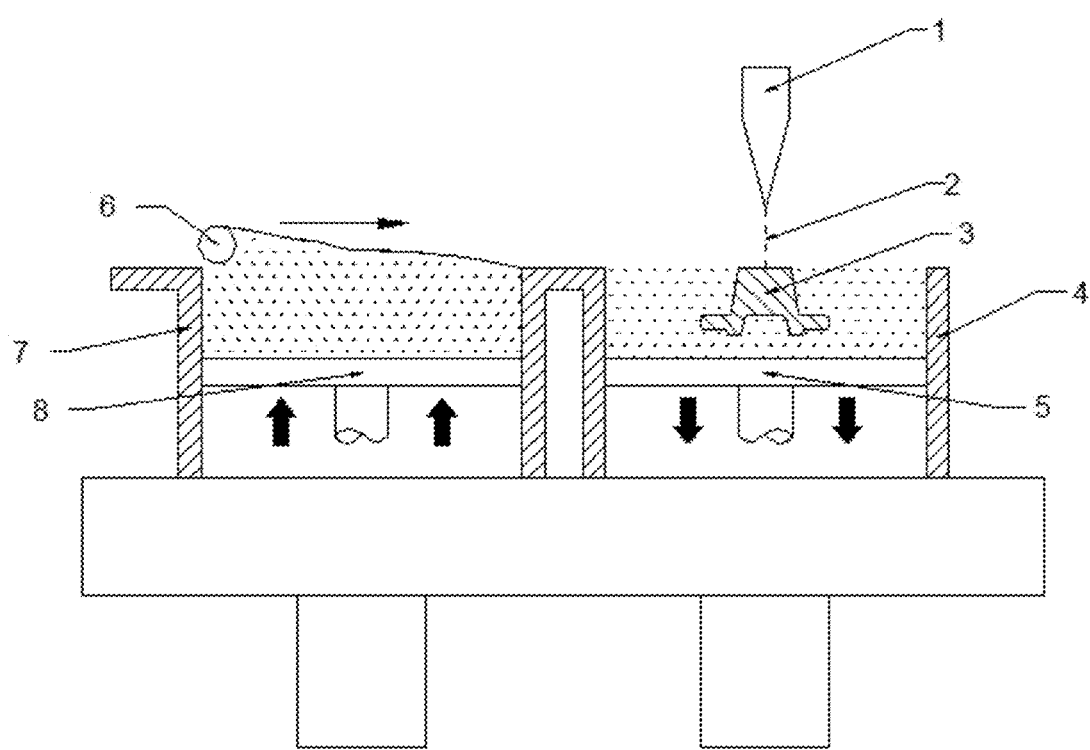
FIG. 2 is a structural schematic diagram of a device for the micro-jetting and bonding technology according the preferred embodiment of the present invention.

A device for the 3D printing technology is shown in FIG. 2. The specific process is as follow:

$Zr_{55}Cu_{30}Ni_5Al_{10}$ amorphous alloy powder with an average particle size of 30 µm prepared by a vacuum gas atomization method is selected to prepare a pre-forging blank. The $Zr_{55}Cu_{30}Ni_5Al_{10}$ amorphous alloy has an amorphous formation critical size of more than 20 mm, a glass transition temperature $T_g$, of 685K, an initial crystallization temperature $T_x$ of 765K and a liquidus temperature $T_L$ of 1164K. Therefore, this amorphous alloy has a supercooled liquid region $\Delta T_x = T_x - T_g = 80K$ and a thermoplastic forming capability index $S = \Delta T_x/(T_L - T_g) = 0.167$, and thus has a good amorphous forming ability.

The amorphous alloy powder is placed in a powder feeding cylinder 7, a layer of amorphous alloy powder with a preset thickness is first laid by a powder laying roller 6, and then the silica sol binder 2 is sprayed onto the pre-laid amorphous alloy powder by a nozzle 1 to form a bonding layer with a thickness of 0.05 mm. After the previous bonding layer is formed, a forming cylinder piston 5 is lowered by 0.05 mm, a powder feeding cylinder piston 8 is lifted by 0.05 mm, and then a certain amount of powder is pushed out of the powder feeding cylinder 7 by the powder laying roller 6 into the forming cylinder 4, laid and compacted. Under the control of the computer, the nozzle 1 selectively sprays the binder according to forming data of the next construction section to build a bonding layer. The excess powder after the powder laying operation of the powder laying roller 6 is collected by a powder collecting device. This process of powder feeding, powder laying and binder spraying is repeated until a pre-forging blank 3 is three-dimensionally printed. The contour size of the three-dimensionally printed pre-forging blank is approximately the same as that of the final forging cavity die.

Step (2): Hot Closed-Die Forging

Figure 3:
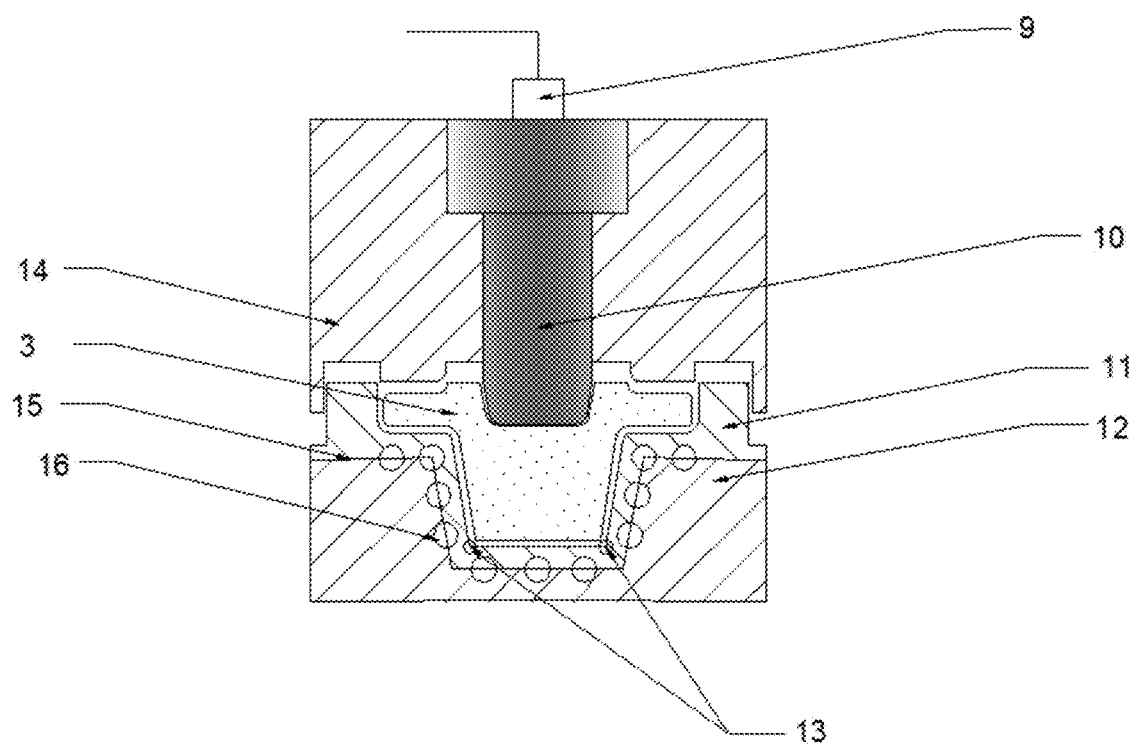
FIG. 3 is a structural schematic diagram of a closed forging die according the preferred embodiment of the present invention.

A structural schematic diagram of a closed forging die is shown in FIG. 3.

The closed forging die consists of two parts: an upper die and a lower die, in which the upper die 14 includes an ultrasonic vibration device 9 and an upper punch 10, and the lower die is composed of an inner-layer cavity die 11 and an outer-layer cavity die 12. In addition, 15 represents a parting line, and 16 represents resistor heating rods with following distribution.

During the forming process, the die is closed first, and then heated by the resistor heating rods 16. When the temperature is raised to 730K between a glass transition temperature $T_g$, and an initial crystallization temperature $T_x$ of the amorphous alloy, the die is opened, the three-dimensionally printed pre-forging blank 3 in the step (1) is placed inside the inner-layer cavity die 11, then the die is closed and heat preservation is performed. During the heat preservation, the ultrasonic vibration device 9 is activated to perform vibration operation at the set frequency and amplitude, and the suction pump connected to the exhaust hole 13 is turned on to increase the negative pressure so as to accelerate the discharge of gas generated by gasification or decomposition of the binder due to heat. Heat preservation is performed at 730K for 2 min, and in a case where the lower die remains stationary, the upper punch 10 and the upper die 14 move down at a set load of 50 MPa and a loading rate of 1 mm/min until the inner cavity of the inner-layer cavity die 11 is completely filled with the pre-forging blank 3, and then pressure maintaining is performed for 3 min. Finally, the ultrasonic vibration device 9 and the resistor heating rods 16 are turned off. At this time, the molding process is finished and the entire molding process takes 5 minutes. According to the isothermal DSC experiment, crystallization does not occur in the $Zr_{55}Cu_{30}Ni_5Al_{10}$ amorphous alloy at 730K for 8 min. Therefore, in the present embodiment, a large-sized and complex-shaped part with a completely amorphous structure can be obtained by using the above method and devices.

While particular embodiments of the present invention have been shown and described, it will be obvious to those skilled in the art that changes and modifications may be made without departing from the spirit and scope of the present invention.

The present invention claimed is:

1. A cold additive and hot forging combined forming method of an amorphous alloy part, comprising:
   (1) making amorphous alloy powder into a pre-forging blank by micro-jetting and bonding 3D printing, comprising:
      laying powder first, and then spraying binder to form a bonding layer, and
      repeating the operations of powder laying and binder spraying until a three-dimensional pre-forging blank is printed; and
   (2) placing the pre-forging blank in the step (1) in a closed forging die to perform hot closed-die forging so as to obtain the amorphous alloy part, the amorphous alloy part having a thickness of greater than 80 mm,
   wherein a contour size and shape of the pre-forging blank are designed according to a contour size and shape of an inner cavity of the closed forging die,
   an exhaust hole is provided in the closed forging die such that gas generated by gasification or decomposition of the binder at a hot die forging temperature is discharged through the exhaust hole in the closed forging die, the hot die forging temperature being between a glass transition temperature $T_g$ and an initial crystallization temperature $T_x$ of the amorphous alloy powder, and
   a hot die forging time is shorter than a crystallization starting time of the amorphous alloy powder at the hot die forging temperature, the hot die forging time being a majority of the crystallization starting time of the amorphous alloy powder at the hot die forging temperature and less than 8 minutes.

2. The forming method of claim 1, wherein the amorphous alloy powder has an amorphous formation critical size of not less than 10 mm, a supercooled liquid region $\Delta T_x$ of more than 50K, and a thermoplastic forming capability index S of more than 0.15.

3. The forming method of claim 1, wherein the amorphous alloy powder has an average particle size of 20 μm to 50 μm.

4. The forming method of claim 1, wherein the bonding layer has a thickness of 0.015 mm to 0.1 mm.

5. The forming method of claim 1, wherein a vibration device is provided at an upper punch of the closed forging die to improve the thermoplastic forming of the amorphous alloy powder.

6. The forming method of claim 5, wherein the vibration device is an ultrasonic vibration device or a mechanical vibration device.

7. The forming method of claim 1, wherein the binder is silica sol, polyvinyl alcohol, or maltodextrin, and a mass of the binder is 6% to 10% of a mass of the amorphous alloy powder.

8. The forming method of claim 1, wherein according to a gas flowing direction during forging, the exhaust hole is opened at a part in the closed forging die where the discharge of gas is facilitated, and the exhaust hole is connected to a suction pump.

9. The formation method of claim 7, wherein the binder is silica sol.

10. The formation method of claim 8, wherein the exhaust hole has a size of less than 0.5 mm.

* * * * *